United States Patent
Hu et al.

(10) Patent No.: US 12,431,799 B2
(45) Date of Patent: Sep. 30, 2025

(54) SWITCHING CYCLE ADAPTIVE CONTROL METHOD FOR SWITCHING POWER SUPPLY

(71) Applicant: X-SIGNAL INTEGRATED CO., LTD., Beijing (CN)

(72) Inventors: Chengyu Hu, Beijing (CN); Nailong Wang, Beijing (CN)

(73) Assignee: X-SIGNAL INTEGRATED CO., LTD., Beijing (CN)

( * ) Notice: Subject to any disclaimer, the term of this patent is extended or adjusted under 35 U.S.C. 154(b) by 0 days.

(21) Appl. No.: 18/970,994

(22) Filed: Dec. 6, 2024

(65) Prior Publication Data

US 2025/0096678 A1  Mar. 20, 2025

Related U.S. Application Data

(63) Continuation of application No. PCT/CN2023/089621, filed on Apr. 20, 2023.

(30) Foreign Application Priority Data

Jun. 6, 2022 (CN) .......................... 202210629125.5

(51) Int. Cl.
*H02M 3/156* (2006.01)

(52) U.S. Cl.
CPC .................... *H02M 3/156* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18;
(Continued)

(56) References Cited

U.S. PATENT DOCUMENTS

| | | | |
|---|---|---|---|
| 11,233,455 B2 * | 1/2022 | Lin | H02M 3/33507 |
| 2014/0055107 A1 | 2/2014 | Tsuruoka et al. | |
| 2015/0078037 A1 | 3/2015 | Lin et al. | |

FOREIGN PATENT DOCUMENTS

| | | |
|---|---|---|
| CN | 101361652 A | 2/2009 |
| CN | 107742984 A | 2/2018 |

(Continued)

*Primary Examiner* — Jeffrey A Gblende
(74) *Attorney, Agent, or Firm* — Bayramoglu Law Offices LLC

(57) ABSTRACT

The provided is a switching cycle adaptive control method for a switching power supply. The method includes: setting a voltage threshold for a bus voltage and forming voltage partitions; acquiring a bus voltage and determining the voltage partition to which the acquired bus voltage belongs; setting a power threshold for an output power of a switching power supply and forming power partitions; performing closed-loop control on a reference voltage and an output voltage of the switching power supply and determining the power partition to which the acquired output power belongs; setting different reference valley numbers P; setting different power valley numbers Q; determining a real-time reference valley number P and a real-time power valley number Q; adding the reference valley number P and the power valley number Q to obtain the number of valleys; and adjusting the frequency of a PWM signal of the switching power supply.

10 Claims, 2 Drawing Sheets

(58) Field of Classification Search
CPC ... G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

FOREIGN PATENT DOCUMENTS

| | | |
|---|---|---|
| CN | 111460850 A | 7/2020 |
| CN | 114977741 A | 8/2022 |

* cited by examiner

SWITCHING CYCLE ADAPTIVE CONTROL METHOD FOR SWITCHING POWER SUPPLY

CROSS-REFERENCE TO THE RELATED APPLICATIONS

This application is a continuation application of International Application No. PCT/CN2023/089621, filed on Apr. 20, 2023, which is based upon and claims priority to Chinese Patent Application No. 202210629125.5, filed on Jun. 6, 2022, the entire contents of which are incorporated herein by reference.

TECHNICAL FIELD

The present invention relates to the field of integrated circuits and communication technology, and in particular to a switching cycle adaptive control method for a switching power supply.

BACKGROUND

In the prior art, quasi-resonant flyback switching power supplies are widely used in low-power applications. In a quasi-resonant control state, a switching power supply operates in discontinuous conduction mode (DCM) or critical conduction mode (CRM). When a current flowing through an energy storage element drops to zero, the parasitic capacitances of the energy storage element and the power switch begins to resonate. When the resonant voltage across the power switch is at its minimum voltage, a main switch is turned on (conduction at valley bottom), thereby reducing the switching loss. The frequency control strategy for this switching power supply is as follows. After inductive demagnetization is determined according to the load power, the next pulse-width modulation (PWM) is turned on after passing several valleys. When the load power of the switching power supply is smaller, the more valleys are required to pass before turning on the next PWM, which leads to a lower driving PWM frequency of the switching power supply. Such a "valley counting" frequency-load curve has better adaptability to a wide range of input/output voltages than that of a single or multiple preset fixed frequency-load curves that are commonly used. Especially in LED lighting and fast charging applications, the maximum output voltage required for one power supply to provide can reach more than 5 times the minimum output voltage. If a fixed frequency curve is used, the huge difference in demagnetization time caused by the huge difference in output voltage makes it impossible to optimize the efficiencies when operating at both the maximum and minimum output voltages at the same time, which may only be remedied by use of multiple curves. This leads to design complexity, cost increase, and risks resulting from curve switching. Therefore, the existing "valley counting" solution is a control method that is more suitable for a wide output voltage range.

However, although this method of turning on by determining the modulation valley number according to the load power is advantageous for a wide output voltage range, it cannot allow optimization for different bus voltages (input AC voltage of the switching power supply). In the Flyback or Boost switching power supply circuit topology, under the same peak current and inductance, the turn-on time is inversely proportional to the bus voltage. Therefore, under the same peak current, the turn-on time at a low voltage can be several times that at a high voltage. This problem is more serious for the boost topology, because the peak current is also inversely proportional to the bus voltage under the same output power. Therefore, under the same load power, the turn-on time at a low bus voltage may be ten or more times that at a high bus voltage. Furthermore, when the output voltage and the output load power are similar, if the same number of valleys are passed to turn on the next PWM at both a high and low bus voltages, the PWM frequency at a high voltage would be higher or even much higher than that at a low voltage. This leads to increased switching loss under high voltages.

Hence, a switching cycle adaptive control method is required in the prior art, which can perform switching cycle adaptive modulation with different modulation valley numbers for respective bus voltages to suppress the increase in switching loss caused when the bus voltage is high.

SUMMARY

A technical objective to be achieved by the present invention is to provide a switching cycle adaptive control method for a switching power supply, which can perform switching cycle adaptive modulation with different modulation valley numbers for respective bus voltages to suppress the increase in switching loss caused when the bus voltage is high.

Based on the above technical objective, the present invention provides a switching cycle adaptive control method for a switching power supply, the method including:
  setting a voltage threshold for a bus voltage and forming voltage partitions by the voltage threshold; acquiring a bus voltage and determining the voltage partition to which the acquired bus voltage belongs;
  setting a power threshold for an output power of a switching power supply and forming power partitions by the power threshold; performing closed-loop control on a reference voltage and an output voltage of the switching power supply to acquire an output power of the switching power supply and determining the power partition to which the acquired output power belongs;
  setting different reference valley numbers P for the respective voltage partitions; setting different power valley numbers Q for the respective power partitions; determining a real-time reference valley number P and a real-time power valley number Q according to the voltage partition of the bus voltage and the power partition of the output power;
  adding the reference valley number P and the power valley number Q to obtain the number of valleys required for a switch element in the switching power supply to pass from turning off to next turning on, and controlling the switch element to be turned on at $(P+Q+1)^{th}$ valley bottom; and
  adjusting the frequency of a PWM signal of the switching power supply according to the number of valleys required to pass.

In one embodiment, the voltage threshold is a root mean square value of the bus voltage.

In one embodiment, the closed-loop control is a proportional-integral (PI) closed-loop control.

In one embodiment, in the setting different reference valley numbers P for the respective voltage partitions, specifically, the reference valley number P set for the voltage partition with a high voltage is greater than the reference valley number P set for the voltage partition with a low voltage.

In one embodiment, the power threshold is a ratio of the output power to the maximum output power of the switching power supply.

In one embodiment, in the setting different power valley numbers Q for the respective power partitions, specifically, the power valley number Q set for the power partition with a high power is smaller than the power valley number Q set for the power partition with a low power.

Another aspect of the present invention is to provide a switching cycle adaptive control system for a switching power supply, the system including: a bus voltage detection module 1, a loop control module 2, and a valley number mapping module 3;

wherein the bus voltage detection module 1 is used to set a voltage threshold for a bus voltage and form voltage partitions by the voltage threshold; and the bus voltage detection module 1 acquires a bus voltage and determines the voltage partition to which the acquired bus voltage belongs;

the loop control module 2 is used to set a power threshold for an output power of a switching power supply and form power partitions by the power threshold; the loop control module 2 performs closed-loop control on a reference voltage and an output voltage of the switching power supply to acquire an output power of the switching power supply and determining the power partition to which the acquired output power belongs;

the valley number mapping module 3 sets different reference valley numbers P for the respective voltage partitions and sets different power valley numbers Q for the respective power partitions; and the valley number mapping module 3 determines a real-time reference valley number P and a real-time power valley number Q according to the voltage partition of the bus voltage and the power partition of the output power; and the valley number mapping module 3 adds the reference valley number P and the power valley number Q to obtain the number of valleys required for a switch element in the switching power supply to pass from turning off to next turning on, and controls the switch element to be turned on at $(P+Q+1)^{th}$ valley bottom.

In one embodiment, the voltage threshold is a root mean square value of the bus voltage.

In one embodiment, the closed-loop control is PI closed-loop control.

In one embodiment, in the setting different reference valley numbers P for the respective voltage partitions, specifically, the reference valley number P set for the voltage partition with a high voltage is greater than the reference valley number P set for the voltage partition with a low voltage.

In one embodiment, the power threshold is a ratio of the output power to the maximum output power of the switching power supply.

In one embodiment, in the setting different power valley numbers Q for the respective power partitions, specifically, the power valley number Q set for the power partition with a high power is smaller than the power valley number Q set for the power partition with a low power.

Compared with the prior art, one or more embodiments of the present invention may have the following inventive features and advantages.

In the present invention, the bus voltage is partitioned, and different reference valley numbers are sampled for high voltage and low voltage, thereby suppressing the problem of excessively high frequency of the PWM signal caused when the bus voltage is high, and thus suppressing the defect of excessively high switching loss of the switching power supply in a high voltage.

Other features and advantages of the present invention will be described in the following description, and partly become apparent from the description, or understood by practicing the present invention. The objective and other advantages of the present invention can be realized and obtained by the structures particularly indicated in the description, claims, and drawings.

BRIEF DESCRIPTION OF THE DRAWINGS

The accompanying drawings are used to provide a further understanding of the present invention and constitute a part of the specification. They are used to explain the present invention along with the examples of the present invention and are not a limitation of the present invention. In the accompanying drawings.

DETAILED DESCRIPTION OF THE EMBODIMENTS

In order to clarify the objective, technical solutions, and advantages of the present invention, the present invention is further described in detail below with reference to the accompanying drawings.

EXAMPLE

Figure 1:
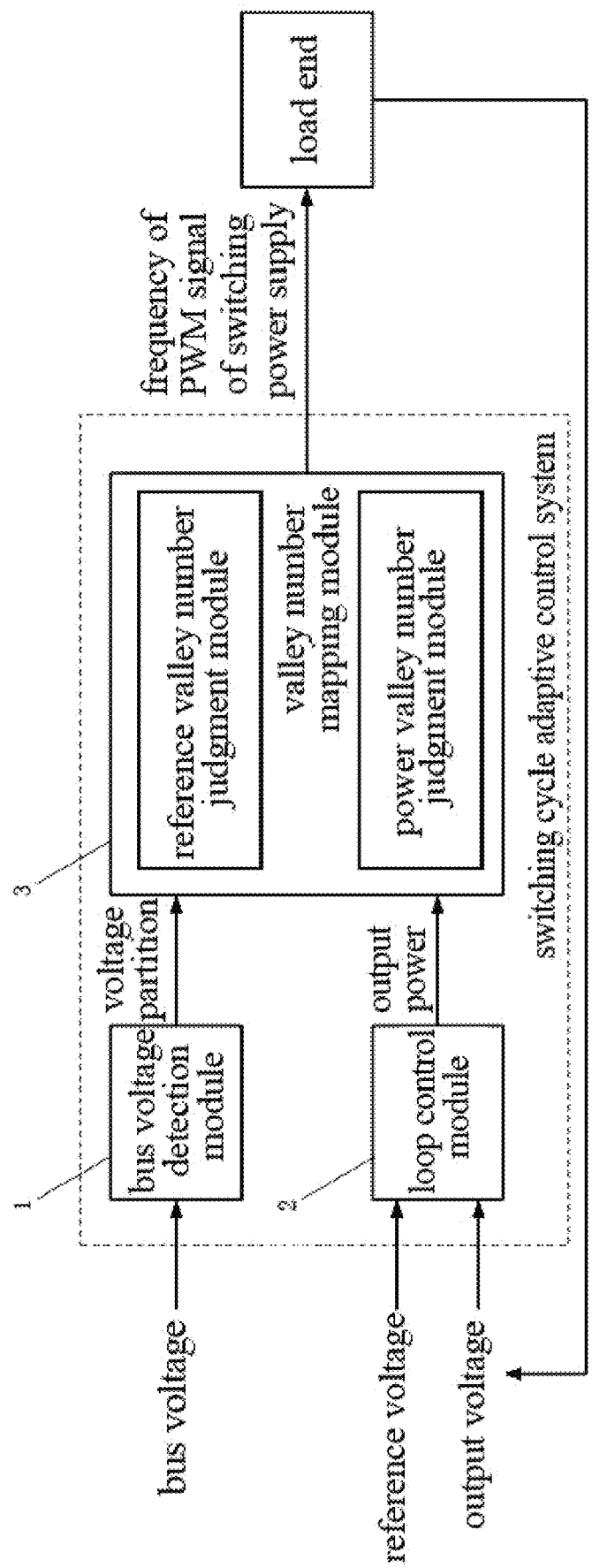
FIG. 1 is a structural schematic diagram of a switching cycle adaptive control system of the present invention.
Figure 2:
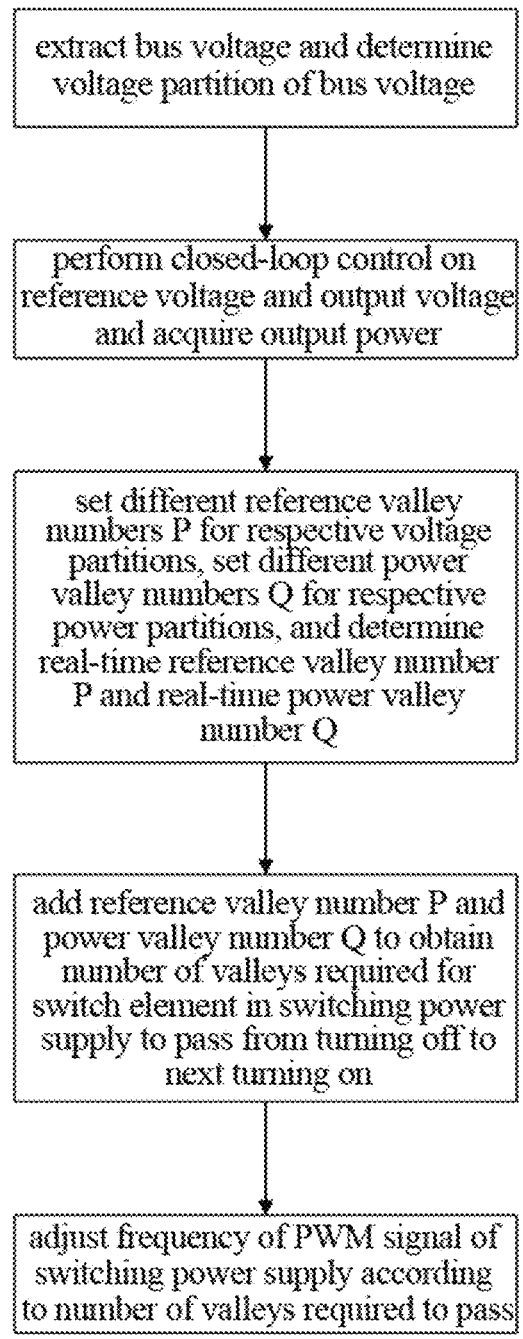
FIG. 2 is a schematic flow chart of a switching cycle adaptive control method of the present invention.

As shown in FIGS. 1 and 2, a switching cycle adaptive control system for a switching power supply according to the present invention includes a bus voltage detection module 1, a loop control module 2, and a valley number mapping module 3.

Specifically, the bus voltage detection module 1 performs partition judgment on an input bus voltage to obtain the voltage partition of the bus voltage. The partition judgment on the input bus voltage includes detecting the sinusoidal waveform of the bus AC voltage, and calculating the peak value, average value or root mean square value of the bus voltage according to the sinusoidal waveform of the bus AC voltage. In this example, the voltage partition of the bus voltage is determined according to the root mean square value of the sinusoidal waveform. The voltage partition refers to a voltage value segment formed by preset voltage thresholds. For example, in this example, a first preset voltage threshold is set to 127V, and a second preset voltage threshold is set to 230V. Voltage value segments formed by the above-mentioned first and second preset voltage thresholds includes: a first voltage partition with a voltage value less than the first preset voltage threshold, that is, with a voltage value <127V; a second voltage partition with a voltage value greater than or equal to the first preset voltage threshold and less than or equal to the second preset voltage threshold, that is, 127V≤voltage value ≤230V; a third voltage partition with a voltage value greater than the second preset voltage threshold, that is, with a voltage value >230V. The root mean square value of the sinusoidal waveform obtained above is compared with the first preset voltage threshold and the second preset voltage threshold for the voltage partitions to determine the voltage partition to which the bus voltage belongs.

The loop control module 2 performs PI closed-loop control according to a preset reference voltage and an output voltage fed back by a load end, and the difference between the preset reference voltage and the output voltage fed back by the load end is proportionally reacted in real-time by the proportional link (P control) in the PI closed-loop, and the output voltage is adjusted by a PI closed-loop controller to reduce the difference. In addition, the static error is eliminated by the integral link (I control) in the PI closed-loop, thereby improving the error-free degree of the PI closed-loop control. Also, the loop control module 2 obtains the output power of the current switching power supply according to the output voltage adjusted by the PI closed-loop control and the rated current value of the switch current.

The valley number mapping module 3 includes a reference valley number judgment module and a power valley number judgment module. The reference valley number judgment module sets different reference valley numbers P for the respective voltage partitions. In this example, each of the three voltage partitions formed by the first preset voltage threshold of 127V and the second preset voltage threshold of 230V, i.e., the first voltage partition, the second voltage partition, and the third voltage partition, is provided with a unique and corresponding reference valley number P. Specifically, the valley number corresponding to the first voltage partition is 0, the valley number corresponding to the second voltage partition is 1, and the valley number corresponding to the third voltage partition is 2. The above-mentioned setting of the reference valley numbers P indicates that the valley number corresponding to a voltage partition in a high voltage range increases, that is, a higher bus voltage corresponds to a larger reference valley number P. Hence, the number of valleys passed by a switch element in the switching power supply before the next conduction increases, thereby extending the period of the PWM signal and reducing the frequency of the PWM signal. The power valley number judgment module sets different output power partitions for the output power output by the loop control module 2, and each of the power partitions is provided with a unique and corresponding power valley number Q.

In this example:
when the output power output by the loop control module 2 is greater than 60% of the maximum output power of the switching power supply, the corresponding power valley number Q is 1;
when the output power output by the loop control module 2 is greater than 50% of the maximum output power of the switching power supply and less than or equal to 60% of the maximum output power of the switching power supply, the corresponding power valley number Q is 2;
when the output power output by the loop control module 2 is greater than 40% of the maximum output power of the switching power supply and less than or equal to 50% of the maximum output power of the switching power supply, the corresponding power valley number Q is 3;
when the output power output by the loop control module 2 is less than or equal to 40% of the maximum output power of the switching power supply, the corresponding power valley number Q is 4; and
the valley number mapping module 3 adds the reference valley number P and the power valley number Q to obtain the number of valleys required for the switch element in the switching power supply to pass from turning off to next turning on, namely, the switch element is turned on at $(P+Q+1)^{th}$ valley bottom.

Due to the adjusting effect of the reference valley number P and the power valley number Q, the PWM signal of the switching power supply is changed, thereby suppressing the increase in switching loss caused by the excessively high frequency of the PWM signal when the bus voltage is high.

FIG. 2 shows a schematic flow chart of a switching cycle adaptive control method for a switching power supply according to the present invention. In this example, the control method includes:
setting a voltage threshold for a bus voltages and forming voltage partitions by the voltage threshold; acquiring a bus voltage and determining the voltage partition to which the acquired bus voltage belongs;
performing closed-loop control on a reference voltage and an output voltage of the switching power supply to acquire an output power of the switching power supply; and at the same time, setting power partitions for the output power of the switching power supply;
setting different reference valley numbers P for the respective bus voltage partitions; setting different power valley numbers Q for the respective power partitions; determining a real-time reference valley number P and a real-time power valley number Q according to the bus voltage and the output power;
adding the reference valley number P and the power valley number Q to obtain the number of valleys required for a switch element in the switching power supply to pass from turning off to next turning on, and controlling the switch element to be turned on at $(P+Q+1)^{th}$ valley bottom; and
adjusting the frequency of a PWM signal of the switching power supply according to the number of valleys required to pass, so as to adaptively adjust the switching cycle to reduce the switching power consumption.

The voltage partitions and power partitions set in this example can be adjusted according to the accuracy degree required for control. In other words, in order to cope with more complex voltage partition situations and output power requirements, more voltage partitions and power partitions can be provided to achieve more accurate control.

The above description is merely specific implementation of the present invention, and the protective scope of the present invention is not limited thereto. Any modification or replacement of the present invention made by a skilled person who is familiar with the present technology within the technical specifications described in the present invention shall fall within the protective scope of the present invention.

What is claimed is:
1. A switching cycle adaptive control method for a switching power supply, comprising:
setting a voltage threshold for a bus voltage and forming voltage partitions based on the voltage threshold; acquiring the bus voltage and determining which voltage partition of the formed voltage partitions the acquired bus voltage belongs to;
setting a power threshold for an output power of the switching power supply and forming power partitions based on the power threshold; performing closed-loop control on a reference voltage and an output voltage of the switching power supply to acquire the output power of the switching power supply and determining which power partition of the formed power partitions the acquired output power belongs to;
setting different reference valley numbers P for the voltage partitions respectively; setting different power valley numbers Q for the power partitions respectively;

determining a real-time reference valley number P and a real-time power valley number Q according to the voltage partition of the bus voltage and the power partition of the output power;

adding the real-time reference valley number P and the real-time power valley number Q to obtain a number of valleys required for a switch element in the switching power supply to pass from turning off to next turning on, and controlling the switch element to be turned on at $(P+Q+1)^{th}$ valley bottom; and adjusting a frequency of a pulse-width modulation (PWM) signal of the switching power supply according to the number of valleys required to pass, wherein when the output power is greater than 60% of a maximum output power of the switching power supply, a corresponding power valley number Q is 1; when the output power is greater than 50% of the maximum output power of the switching power supply and less than or equal to 60% of the maximum output power of the switching power supply, a corresponding power valley number Q is 2; when the output power is greater than 40% of the maximum output power of the switching power supply and less than or equal to 50% of the maximum output power of the switching power supply, a corresponding power valley number Q is 3; and when the output power is less than or equal to 40% of the maximum output power of the switching power supply, a corresponding power valley number Q is 4.

2. The switching cycle adaptive control method for the switching power supply according to claim 1, wherein the voltage threshold is a root mean square value of the bus voltage; and the closed-loop control is a proportional-integral (PI) closed-loop control.

3. The switching cycle adaptive control method for the switching power supply according to claim 1, wherein in the setting the different reference valley numbers P for the voltage partitions respectively, the reference valley number P set for the voltage partition with a high voltage is greater than a reference valley number set for the voltage partition with a low voltage.

4. The switching cycle adaptive control method for the switching power supply according to claim 1, wherein the power threshold is a ratio of the output power to the maximum output power of the switching power supply.

5. The switching cycle adaptive control method for the switching power supply according to claim 4, wherein in the setting the different power valley numbers Q for the power partitions respectively, the power valley number Q set for the power partition with a high power is smaller than the power valley number Q set for the power partition with a low power.

6. A switching cycle adaptive control system for a switching power supply, the system comprising: a bus voltage detection module, a loop control module, and a valley number mapping module;

wherein the bus voltage detection module is configured to set a voltage threshold for a bus voltage and form voltage partitions based on the voltage threshold; and the bus voltage detection module acquires the bus voltage and determines which voltage partition of the voltage partitions the acquired bus voltage belongs to;

the loop control module is configured to set a power threshold for an output power of the switching power supply and form power partitions based on the power threshold; the loop control module performs closed-loop control on a reference voltage and an output voltage of the switching power supply to acquire the output power of the switching power supply and determining which power partition of power partitions the acquired output power belongs to;

the valley number mapping module sets different reference valley numbers P for the voltage partitions respectively and sets different power valley numbers Q for the power partitions respectively; and the valley number mapping module determines a real-time reference valley number P and a real-time power valley number Q according to the voltage partition of the bus voltage and the power partition of the output power;

the valley number mapping module adds the real-time reference valley number P and the real-time power valley number Q to obtain a number of valleys required for a switch element in the switching power supply to pass from turning off to next turning on, and controls the switch element to be turned on at $(P+Q+1)^{th}$ valley bottom; and when the output power is greater than 60% of a maximum output power of the switching power supply, a corresponding power valley number Q is 1; when the output power is greater than 50% of the maximum output power of the switching power supply and less than or equal to 60% of the maximum output power of the switching power supply, a corresponding power valley number Q is 2; when the output power is greater than 40% of the maximum output power of the switching power supply and less than or equal to 50% of the maximum output power of the switching power supply, a corresponding power valley number Q is 3; and when the output power is less than or equal to 40% of the maximum output power of the switching power supply, a corresponding power valley number Q is 4.

7. The switching cycle adaptive control system for the switching power supply according to claim 6, wherein the voltage threshold is a root mean square value of the bus voltage; and the closed-loop control is a PI closed-loop control.

8. The switching cycle adaptive control system for the switching power supply according to claim 6, wherein in the setting the different reference valley numbers P for the voltage partitions respectively, the reference valley number P set for the voltage partition with a high voltage is greater than a reference valley number set for the voltage partition with a low voltage.

9. The switching cycle adaptive control system for the switching power supply according to claim 6, wherein the power threshold is a ratio of the output power to the maximum output power of the switching power supply.

10. The switching cycle adaptive control system for the switching power supply according to claim 7, wherein in the setting the different power valley numbers Q for the power partitions respectively, the power valley number Q set for the power partition with a high power is smaller than the power valley number Q set for the power partition with a low power.

* * * * *